US012427488B2

(12) United States Patent
Zylstra

(10) Patent No.: US 12,427,488 B2
(45) Date of Patent: Sep. 30, 2025

(54) MULTI-COMPONENT FLUID MIXING DEVICE

(71) Applicant: Philip Zylstra, Port Stanley (CA)

(72) Inventor: Philip Zylstra, Port Stanley (CA)

( * ) Notice: Subject to any disclaimer, the term of this patent is extended or adjusted under 35 U.S.C. 154(b) by 633 days.

(21) Appl. No.: 17/815,536

(22) Filed: Jul. 27, 2022

(65) Prior Publication Data

US 2023/0032382 A1 Feb. 2, 2023

Related U.S. Application Data

(60) Provisional application No. 63/226,211, filed on Jul. 28, 2021.

(51) Int. Cl.

| | |
|---|---|
| ***B01F 23/45*** | (2022.01) |
| ***B01F 25/40*** | (2022.01) |
| ***B01F 35/00*** | (2022.01) |
| ***B01F 35/71*** | (2022.01) |
| ***B05B 7/04*** | (2006.01) |
| *B01F 25/00* | (2022.01) |

(52) U.S. Cl.

CPC .............. *B01F 23/45* (2022.01); *B01F 25/40* (2022.01); *B01F 35/55* (2022.01); *B01F 35/71805* (2022.01); *B05B 7/0408* (2013.01); *B01F 2025/911* (2022.01); *B01F 2025/932* (2022.01)

(58) Field of Classification Search

CPC ................ B01F 25/40; B01F 35/71805; B01F 2025/911; B01F 2025/932

See application file for complete search history.

(56) References Cited

U.S. PATENT DOCUMENTS

| | | | | |
|---|---|---|---|---|
| 2,513,081 | A * | 6/1950 | Clark | B05B 7/0408 239/428 |
| 3,790,030 | A | 2/1974 | Ives | |
| 4,767,025 | A | 8/1988 | Gebauer et al. | |
| 4,934,827 | A | 6/1990 | Taschke et al. | |
| 5,027,975 | A | 7/1991 | Keske et al. | |
| 5,092,492 | A | 3/1992 | Centea | |
| 5,260,101 | A | 11/1993 | Larson et al. | |
| 5,375,743 | A | 12/1994 | Soudan | |
| 6,158,624 | A | 12/2000 | Grigg et al. | |
| 6,375,096 | B1 | 4/2002 | Rashidi | |
| 7,217,442 | B2 | 5/2007 | Wilt et al. | |
| 8,524,327 | B2 | 9/2013 | Wanthal et al. | |
| 8,647,720 | B2 | 2/2014 | Staunton et al. | |
| 8,708,202 | B2 | 4/2014 | Robertson et al. | |
| 9,586,221 | B2 | 3/2017 | Charpie et al. | |
| 10,098,683 | B2 | 10/2018 | Vogt | |
| 10,220,397 | B2 | 3/2019 | Swab et al. | |
| 10,444,048 | B2 | 10/2019 | Humpal et al. | |
| 11,084,008 | B2 | 8/2021 | Janssen et al. | |
| 2008/0144426 | A1 | 6/2008 | Janssen et al. | |

(Continued)

FOREIGN PATENT DOCUMENTS

| | | | |
|---|---|---|---|
| DE | 10158335 | C1 | 6/2003 |
| WO | 2002075210 | A1 | 9/2002 |
| WO | 2021087410 | A1 | 5/2021 |

*Primary Examiner* — Anshu Bhatia

(57) ABSTRACT

A multi-component fluid mixing device for mixing two or more fluids which can be used with an applicator tool, such as a spray gun. The mixing device is used with a removable cartridge that is pressure fitted into the body of the mixing device using an actuation mechanism that elevates a cartridge engagement base to create a fluid-tight seal.

20 Claims, 11 Drawing Sheets

(56) References Cited

U.S. PATENT DOCUMENTS

| | | | |
|---|---|---|---|
| 2018/0126396 A1* | 5/2018 | Ellis | B05B 7/0025 |
| 2018/0221897 A1 | 8/2018 | Collins | |
| 2018/0353982 A1 | 12/2018 | Owens et al. | |

* cited by examiner

MULTI-COMPONENT FLUID MIXING DEVICE

CROSS-REFERENCE TO RELATED APPLICATIONS

This application claims priority to United States provisional patent application U.S. 63/226,211 filed 28 Jul. 2021, which is hereby incorporated by reference herein in its entirety.

FIELD OF THE INVENTION

The present invention pertains to fluid mixing and delivery systems and devices, in particular to a multi-component mixing device for mixing and discharge of liquids or other fluent or fluid materials from two or more sources.

BACKGROUND

Multi-component fluid mixing devices receive fluids from two or more sources and mix the fluids together. Multi-component systems are often used to apply two or more components that, when mixed, react or need to be mixed together, and which need to be mixed thoroughly and rapidly just prior to application. The fluid mixture is then applied to a surface for curing or drying. Some examples of reactive multi-component systems include sealants, polymers, reactive cleaning solutions, adhesives, and foams such as construction and insulation foams. Other mixtures that can benefit from independent storage and mixing just prior to application include body makeup, tanning solutions, paints, coatings, and non-reactive cleaning solutions. In many cases, such as in the application of reactive mixtures, establishing and maintaining an optimal ratio and mixing speed of the substances to be mixed can result in higher quality product upon application.

In mixing devices there is the potential for viscous or reactive fluid materials to harden and clog in regions of a device that are used to mix those materials. In an example of a multi-component mixing device, United States patent application number US20180221897 describes an apparatus for multi-component mixing having a low-pressure spray gun for applying one-component foam as a spray and a bead including a low-pressure canister connector and a low-pressure air hose connector including a dual-use spray gun with a low-pressure canister connector and a low-pressure air hose connector, a compressed air supply, and a compressed air hose.

The preparation of mixed fluids can lead to excessive mixing of substances to ensure that there is sufficient mixed product to complete the job or work. This phenomenon is sometimes referred to as "overmixing", which is preparation of more mixed product than is required for a particular job and results in wastage of mixed product. Overmixing occurs especially when a mixed product cures or hardens over time in a situation where, following application of the mixed product, a curing or hardening step is done, such as by applying temperature or ultraviolet light. In the automotive industry, for example, typical clear coats are two component paints having a base and a hardener which are separately stored and mixed in a specified ratio just prior to application. A common method for mixing these components is done over a scale to ensure that the proper ratio is combined, at which point the components are mixed in a cup or container, and the container is attached to a spray applicator for spraying onto a surface. Mixing the components in a container can result in overmixing when more material is prepared than is required for the job. This results in wasted materials as the coating or paint has a limited use lifetime before it hardens. In addition, the large containers used to mix the components are generally disposable, causing material waste. In painting a surface extra paint is almost always needed to be mixed to ensure that proper coverage is attained and the mixture composition remains consistent through the job. In the case of one commercial system, extra paint must be mixed because the bag that holds the paint collapses in on itself; if there is too little paint in the cup it will choke the flow of the paint and spatter on the surface being sprayed. If the painter has to mix additional paint in the middle of the painting process it can cause the finish to be compromised as the paint that has just been sprayed may partially cure during the time required for mixing of the additional paint needed to complete the job and the second mixing may be different than the first resulting in a blemished or imperfect surface finish.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a multi-component mixing device for mixing and discharge of two or more liquids or other fluent or fluid materials from two or more sources. It is another object of the present invention to provide a multi-component mixing device for effective mixing of two or more components and attachment to a mixed fluid application device, such as a spray mixer.

In an aspect there is provided a multi-component fluid mixing device comprising: a device body comprising at least two fluid supply adapters for receiving fluid input and a mixed fluid output conduit; an engagement base comprising at least two fluid input conduits fluidly connected to the fluid supply adapters; an actuator connected to the engagement base, wherein actuation of the engagement base by the actuator moves the fluid input conduits on the engagement base toward the mixed fluid output conduit; and an adapter adjacent the mixed fluid output conduit to attach the mixing device with an application device.

In an embodiment, the actuator is a lever arm connected to the device body by a hinge.

In another embodiment, the actuator is lockable in an operating state when the engagement base is fully raised relative to the mixed fluid output conduit.

In another embodiment, the device further comprises a mixing cartridge comprising a mixing chamber fluidly connecting the at least two fluid supply adapters and the mixed fluid output conduit.

In another embodiment, the mixing cartridge is removable from the device body.

In another embodiment, the device body comprises an alignment feature to align the mixing cartridge in the device body.

In another embodiment, the at least two fluid supply adapters comprise a valve for controlling fluid flow. In another embodiment, the valve is a check valve.

In another embodiment, the device further comprises an engagement feature for matching engagement with a mixing cartridge.

In another embodiment, the device comprises more than two fluid input conduits.

In another aspect there is provided a multi-component fluid mixing system comprising: a mixing device comprising: a device body comprising at least two fluid supply adapters for receiving fluid input and a mixed fluid output conduit; an engagement base comprising at least two fluid input conduits fluidly connected to the fluid supply adapters; an actuator connected to the engagement base, wherein actuation of the engagement base by the actuator moves the fluid input conduits on the engagement base toward the mixed fluid output conduit; and an adapter adjacent the mixed fluid output conduit to attach the mixing device with an application device; and a mixing cartridge comprising a mixing chamber, the mixing chamber having an input end with at least two fluid input ports for fluid engagement with the at least two fluid supply conduits of the device body and an output end having one mixed fluid output port for fluid engagement with the mixed fluid output conduit of the device body.

In an embodiment, the mixing cartridge comprises a baffle insert inside the mixing chamber positioned between the at least two fluid input ports and the fluid output port.

In an embodiment, of the mixing system the baffle insert is removable.

In another embodiment, of the mixing system the mixing cartridge and mixing device further comprise complementary engagement features for matching engagement of the mixing device to the mixing cartridge.

In another embodiment, of the mixing system the device body comprises two fluid supply adapters and the mixing cartridge comprises two fluid input ports.

In another embodiment, of the mixing system the actuator is a lever arm connected to the device body by a hinge.

In another embodiment, of the mixing system the actuator is lockable in an operating state when the engagement base is raised relative to the mixed fluid output conduit.

In another embodiment, of the mixing system the at least two fluid supply adapters comprise a valve for controlling fluid flow.

In another embodiment, of the mixing system the mixing cartridge is fluidically sealed to the mixing device when the engagement base is fully raised relative to the mixed fluid output conduit.

In another aspect there is provided a multi-component fluid mixing device comprising: a device body comprising two fluid supply adapters for receiving fluid input and a mixed fluid output conduit; an engagement base comprising at least two fluid input conduits fluidly connected to the fluid supply adapters; an actuator connected to the engagement base, wherein actuation of the engagement base by the actuator moves the fluid input conduits on the engagement base toward the mixed fluid output conduit.

In an embodiment, the actuator is a lever arm connected to the device body by a hinge.

In another embodiment, the actuator is lockable in an operating state.

In another embodiment, the device further comprises a cartridge comprising a mixing chamber fluidly connecting the two fluid supply adapters and the mixed fluid output conduit.

In another embodiment, the cartridge is removable from the device body.

In another embodiment, the device body comprises an alignment feature to align a cartridge in the mixing device.

In another embodiment, the device further comprises an applicator adapter to connect the mixed output conduit to an applicator device.

In another embodiment, the two fluid supply adapters each have an inlet for receiving fluid from a fluid supply.

Embodiments of the present invention as recited herein may be combined in any combination or permutation.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
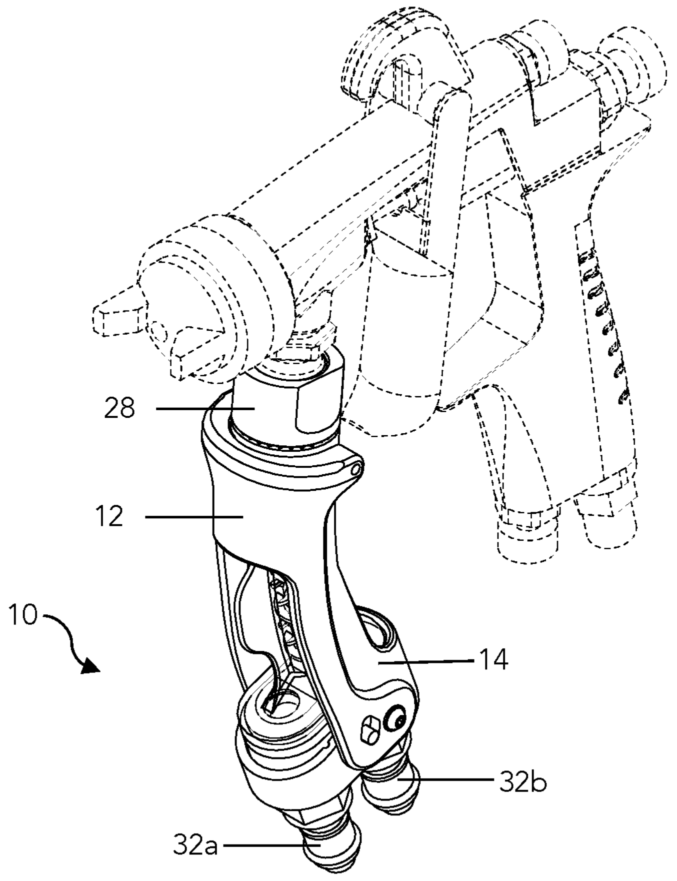
FIG. 1 is a top isometric view of a multi-component mixing device attached to a spray gun.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

As used herein, the terms "comprise," "comprising," "having," "including" and "containing," and grammatical variations thereof, are to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appropriate. The term "consisting of" when used herein in connection with a composition, device, article, system, use, or method, excludes the presence of additional elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

Herein is described a multi-component fluid mixing device capable of receiving a mixing cartridge for mixing two or more fluids for creating a multi-component mixture which can be used in a variety of applications. The mixing device receives fluid from at least two sources and provides the input fluids to a mixing chamber in a mixing cartridge for effective mixing. The mixed fluid can then be used in a variety of industrial, commercial, and home applications. The present multi-component fluid mixing device can be used to mix a variety of fluid mixture types, including but not limited to sealants, polymers, reactive cleaning solutions, adhesives, foams such as construction and insulation foams, body makeup, tanning solutions, paints, coatings, and non-reactive cleaning solutions. In addition, controlled metered fluid addition to the multi-component mixing device can accurately account for volume of fluid used, providing ratio control between the fluids as well as fluid use reporting for inventory control, accounting and billing purposes. A mixing cartridge is secured to the mixing device body with a pressure-fitting mechanism that is initiated in response to closure of a lever arm or pressure fit around the mixing cartridge. Alignment of the mixing cartridge within the device body is achieved by a combination of one or more matching and mating cartridge flanges and frames, alignment features, and aligned mixing chamber inputs and outputs which match to corresponding conduits on the mixing device. Once assembled, the mixing device and mixing cartridge can be connected to and used in conjunction with any number of applicator systems to expel the mixed fluid in the desired manner.

Metering of fluids into the mixing device and fitted mixing chamber or cartridge can also avoid overpreparation of the fluid mixture, reducing waste. The mixing device can be attached to, for example, a spray applicator for spraying the mixed fluid mixture onto a surface, such as for the spraying of paints, clearcoats, primers, foams, sealers, adhesives, insulation, waxes, body makeup, tanning products, and cleaning solutions. Other types of applicators may be attached to the mixing device, for example for use in mixing and installation of foam insulation, with caulking guns and nozzles, or with other chemical application systems. The mixing device is particularly useful in applications where a metered volume ratio of two fluids are mixed, such as in the formulation and preparation of carefully metered or ratioed mixtures, and particularly for products that harden upon setting, cooling, or curing. Although reference is made herein to spray mixing and use of the mixing device in spray applications, it is understood that the same mixing device may be used in these and other application systems which may use alternative application methods to spraying.

A system that mixes the material at the spray gun or alternative applicator system is beneficial as a means to limit the waste of the material as a monetary cost but also to mitigate harmful chemical waste that may have negatively effects to the environment. Chemical paints and adhesives are sprayed in many industries and for many applications, most of which present negative environmental repercussions in their use and disposal. Users of these materials often are often not educated on how to handle and dispose of the waste associated with multiple component paints. By limiting the amount of both chemical waste as well as material waste, the user can reduce the environmental impact of the needed material to complete a spraying or multi-component application task. Many applications can benefit from the use of a spraying or application system that mixes two or more input components while controlling the amount of input chemicals used. For context, many mixing systems in commercial use fixed amount batches of mixed material which gets thrown away if it isn't used immediately.

By limiting the amount of each component in the mixture at the source, waste of materials can be reduced to smaller amounts by limiting the amount of each component to the exact amount required. Industries that can benefit from the present system include but are not limited to spray foam applications, sealers and primers for the construction industry, automotive paints, and wood varnishes and sealers. In these industries the materials that are being sprayed often consist of a base material and catalyst or hardener. In many cases the base material, such as but not limited to the paint color, varnish finish, foam or sealer, needs a catalyst to induce a chemical reaction to dry or harden to initiate a reaction. These combinations of materials are mixed at a specific ratio with the base being A and the catalyst or hardener being B. The materials, A and B, must be adequately mixed together to attain the desired action. In an example of base coat materials for automotive clear coats, the chemicals can consist of, but are not limited to, heptan-2-one, n-butyl acetate, 2-ethylhexyl acetate, acetone, isopropyl alcohol, bis-sebacate and methyl sebacate. Other industrial applications have varying formulas of base material that contain chemical to make up their specific product for a specific application. Hardener materials for automotive clear coats can consist of, but are not limited to, Hexamethylene dissocyanate, oligomers, butanone, xylene, toluene and ethylbenzene. In another example, a cosmetic makeup could contain a color (A), and an adhesion catalyst or solvent (B) that would need to be adequately mixed together to gain the desired effect. In all cases of mixing two or more components for a desired effect, each component has a monetary value and reducing waste in the mixing process saves money to the user.

FIG. 1 is a top isometric view of a multi-component mixing device 10 having a lever arm 12 that is connected at a pivot point to a device body 14, two fluid supply adapters 32*a*, 32*b*, and a mixed fluid output conduit that feeds into an applicating device. A spray gun applicating device is shown connected to the mixing device 10 through an applicator adapter 28. Fluid supply adapters 32*a*, 32*b* are each connected to a different fluid supply, and the opening of valves allows fluid from each fluid supply to enter the mixing device 10. In one embodiment the valve can be a check valve, which are unidirectional valves that provide unobstructed flow in one direction as long as flow pressure remains constant. Check valves can protect a fluidic transfer system against reverse flow. Main types of check valves are ball valves, piston valves, pin valves, disc check valves, and stop check valves. The mixing device 10 can further be connected with one or more pump or compressor to provide pressurized fluids for mixing.

Figure 2:
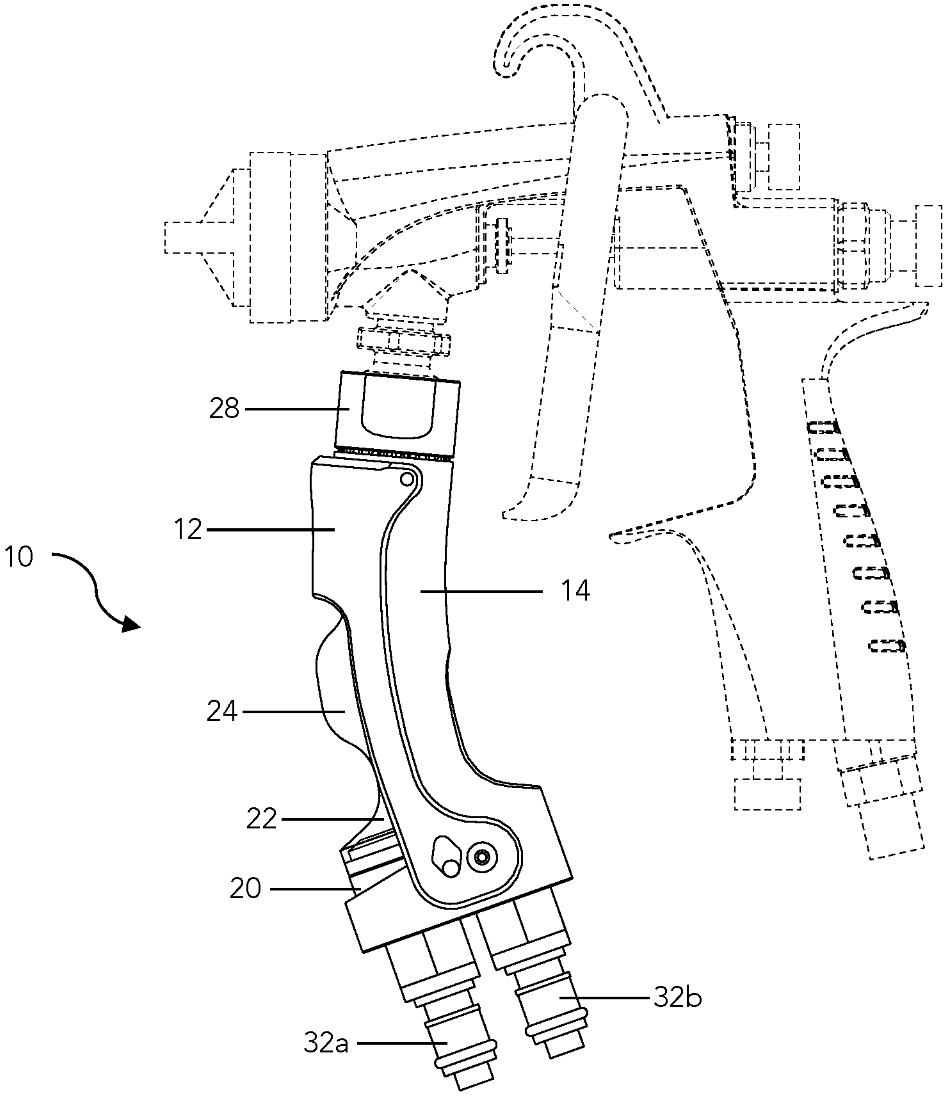
FIG. 2 is a side view of a multi-component mixing device attached to a spray gun.

FIG. 2 is a side view of the mixing device 10 engaged with a spray gun apparatus engaged via an applicator adapter 28 for application of the fluid mixture onto a surface. A mixing cartridge 24 is engaged inside the device body 14 and the cartridge engagement base 20 is shown engaged with the device body 14. In the configuration where lever arm 12 is in a closed position relative to the device body, engagement base 20 on the fluid input end of the device body 14 rises toward the mixed fluid output end of the device body such that the engagement base 20 makes a sealing connection with the cartridge input end 22. This sealing connection between the lower region of the cartridge input end 22 and device body 14 seals the mixing device to the mixing cartridge 24 and limits fluid to escape during device use, even under fluid pressure. Although the present mixing device is shown with an actuated cartridge engagement base at the inlet end of the mixing device, it is understood that instead of or in addition to an actuated engagement base at the fluid inlet end, the device may have an actuated engagement feature at the outlet end or mixed fluid end of the device. As such, in some embodiments both the input and the output ends of the mixing device may be actuated to move toward and away from one another to engage a cartridge.

In use, fluid supply adapters 32*a*, 32*b* can be connected with fluid supply tanks, in addition to flow assisting devices such as, for example, one or more pumps, valves, compressors, or hoses. Fluids to be mixed in the mixing device 10 enter the mixing device 10 through fluid supply adapters 32*a*, 32*b* and into the mixing cartridge 24 via fluid input conduits or fluid input ports on mixing cartridge 24 which fluidly connect to the fluid supply adapters, and into a cartridge mixing chamber in the mixing cartridge 24 where mixing of the fluids occurs. The mixed fluid then passes out of the cartridge through a mixed fluid output port and through a mixed fluid conduit in the device body and into an applicator device that can be used to apply the mixed fluid to a surface.

Figure 3:
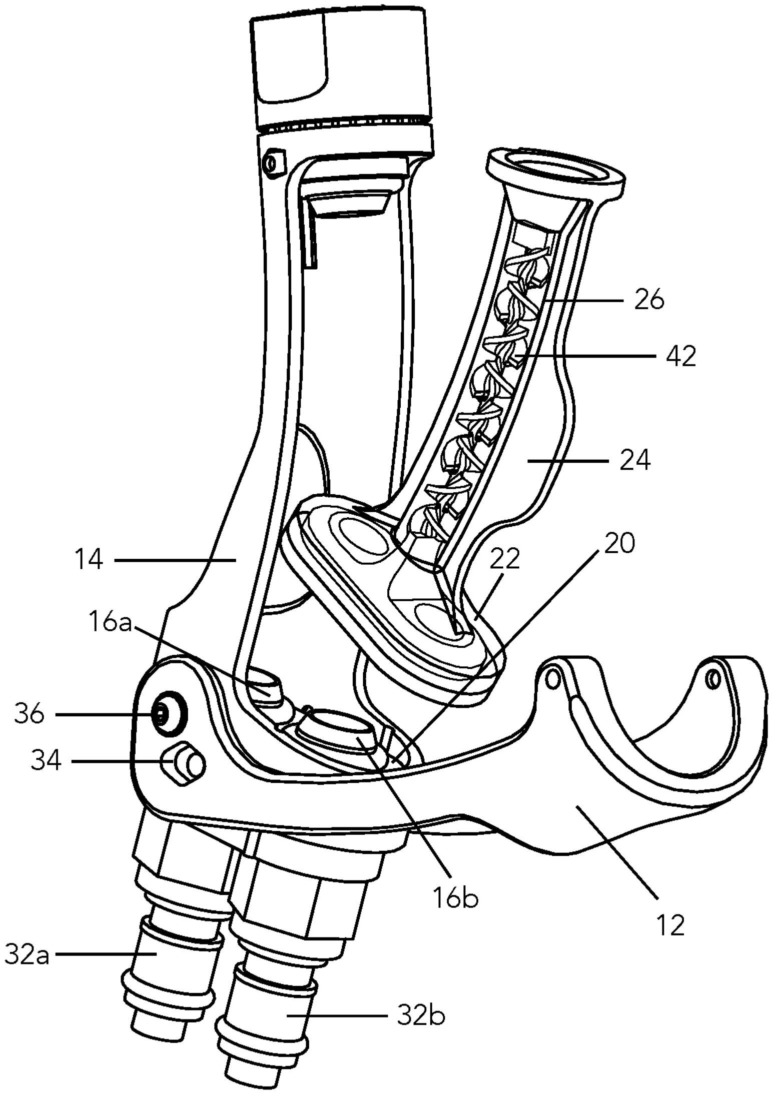
FIG. 3 is an isometric view of a multi-component mixing device with the lever arm in an open position and the mixing cartridge separated from the device body.

FIG. 3 is an isometric view of one example of the mixing device with the lever arm 12 in an open position and the mixing cartridge 24 separated from the device body 14. Removable mixing cartridge 24 is designed to be pressure-fitted to the device body with the lever arm, with movable engagement base 20 of the mixing device facilitating engagement and release of the mixing cartridge 24 by actuation of the lever arm. Lever arm is connected to the device body 14 at hinge 36 which allows the lever arm to pivot along the hinge axis. As the lever arm 12 pivots, actuation guide 34 in the lever arm 12 engages with a pin or protrusion on the engagement base to raise the engagement base 20 when the lever arm 12 is in the upright engaged position and lower the engagement base 20 when the lever arm 12 is an opened position. Lowering or disengagement of the lever arm 12 from the device body 14 provides space for a cartridge to be fitted inside the device body 14, and engagement of the lever arm 12 to the device body 14 raises the engagement base 20 to create a pressure-fit fluidic seal of the device to the cartridge at the fluid input and mixed fluid output ends or ports of the mixing cartridge 24. Closure of the lever arm to engage the mixing device with the cartridge also engages pressure-sealing rings in addition to friction fitting and/or alignment with matching shaped grooves and contours in the locations where the cartridge engages with the mixing device. Engagement particularly occurs between the fluid conduits as well as at the inlet end and outlet end of the mixing cartridge. A custom fit cartridge that fits snugly inside the device body with proper alignment with the device body ensures a fluid-tight seal at both ends of the mixing cartridge 24, which is particularly advantageous in the mixing of fluids under moderate or high fluid pressures. The mixing device can further comprise a locking element to lock the lever arm 12 to the device body 14 to ensure safe operation while fluid is being applied to the mixing device.

Although the present device is shown with a lever arm, it is clear that other positioning and locking devices may also be used to raise and lower the engagement base 20 on the mixing device 10 and to secure the cartridge such that the fluid input conduits and mixed fluid conduit on the mixing device are fluidly sealed to the mixing cartridge 24. These include but are not limited to hydraulic systems, servomotors, and other mechanical systems. Fluid supply adapters 32*a*, 32*b* are connected to fluid tanks or supply lines to provide mixing fluids to the mixing device and are supplied to the mixing cartridge 24 via fluid input conduits 16*a*, 16*b*. The two fluid components are mixed only in the mixing cartridge 24, and leave the mixing device through a mixed fluid conduit fluidly connected to the outflow end of the cartridge.

The removable mixing cartridge 24 is engageable with the mixing device to provide a location and channels for optimal fluid directing and mixing of two or more fluid substances while minimizing contact of the mixed fluid combination with the internal surfaces of the mixing device. As shown, the cartridge input end 22 engages with two fluid input conduits 16*a*, 16*b* in the mixing device and directs the applied fluids into the mixing chamber 26 in the mixing cartridge 24. As the two fluids travel along the mixing chamber 26 the fluids are mixed, and exit the output end of the cartridge fully mixed. For mixed fluids that harden or cure upon mixing, keeping the mixed fluid in a removable mixing cartridge limits clogging and deposition of the mixed material onto high pressure fluid conduits that may be more challenging to access for cleaning. The removable mixing cartridge 24 and optional baffle mixer 42 used with the present mixing device can also be tailored to suit the fluids being mixed to suit a variety of fluid viscosities, density, specific weight, type such as solution or emulsion, specific gravity, dynamic viscosity, or pressure requirements. In particular, the cross-sectional size and shape of the mixing chamber 26 of the cartridge can be selected for the particular fluid composition to be mixed. In addition, the cartridge can have one or more baffles or mixing features to enhance mixing. An optionally removable baffle mixer 42 inside the mixing chamber 26 of the mixing cartridge 24 can provide a directed mixing channel network for optimal mixing of the fluid components. The baffle mixer can also be selected for the mix composition and/or mix conditions being used. A baffle mixer 26 insert can also be used in the cartridge mixing chamber 26 and can optionally exist as an independent entity which can be inserted or removed, or can be manufactured as an integral element of the mixing cartridge 24. The channel network provided by baffles inside the mixing chamber 26 direct the fluids to combine and mix as they pass through the mixing chamber 26. A variety of baffle inserts and baffle configurations can be available based on the desired mixing profile of the components as well as the desired mixing process or pressure conditions.

Figure 4:
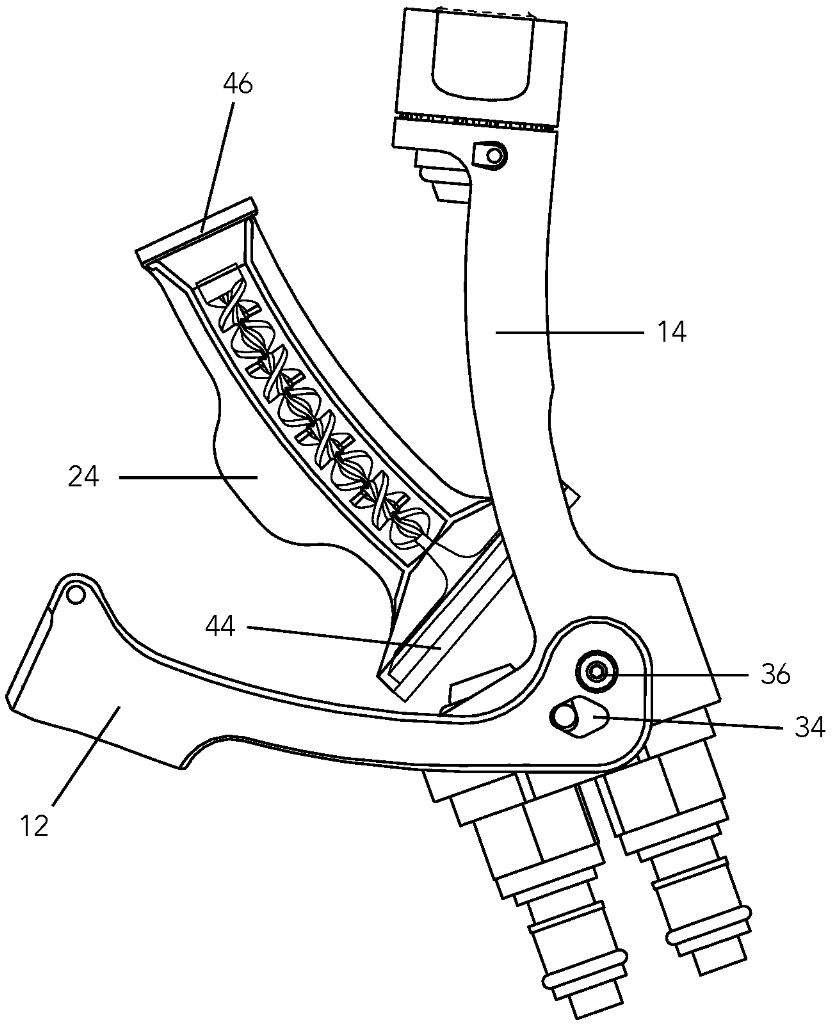
FIG. 4 is a side view of a multi-component mixing device and mixing cartridge.

FIG. 4 is a side view of the mixing device with lever arm 12 in an open position, the cartridge engagement base on the mixing device in a lowered position, and mixing cartridge 24 separated from the device body 14. The cartridge comprises a bottom flange 44 and a top flange 46, which interact and engage with upper and lower regions of the device body 14 to form a fluidic connection, respectively, when the lever arm 12 is closed and cartridge engagement base is in a raised position due to actuation of the lever arm 12 with actuation guide 34 which is moveably connected with the mixing device cartridge engagement base. In the engaged position, the input and output of the cartridge mixing chamber engages in a fluid-tight connection with respective fluid input and output conduits in the mixing device. In a non-engaged position when the lever arm 12 is down upon rotation around hinge 36, the cartridge is disengaged and can be inserted or removed from the mixing device.

Figure 5A:
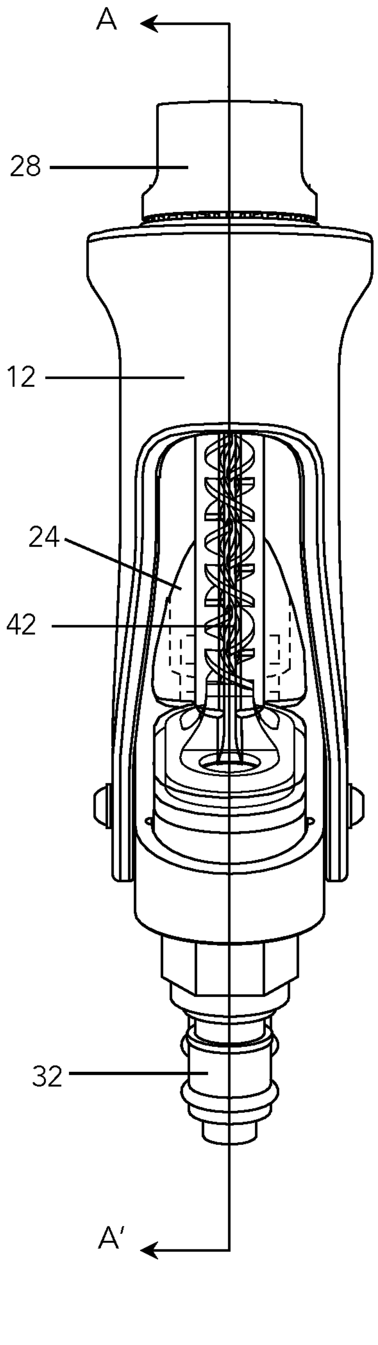
FIG. 5A is a front view of a multi-component mixing device with the lever arm in a closed position and an engaged mixing cartridge.

FIG. 5A is a front view of a mixing device with the lever arm 12 in a closed position and engaged with a mixing cartridge 24. Fluid enters the mixing device through fluid supply adapter 32 and travels through an input fluid conduit inside the mixing device into mixing cartridge 24. Input fluids are mixed inside the mixing chamber in the mixing cartridge 24 by interaction with baffle mixer 42 then travel out of the cartridge and into an application device. Applicator adapter 28 attached to the mixing device can be provided to allow a variety of applicator devices to be attached to the mixing device with a variety of connection types. The applicator adapter 28 can have, for example, threaded connections of various types, one or more friction fit seals, one or more locking or securing devices, or a combination thereof.

Figure 5B:
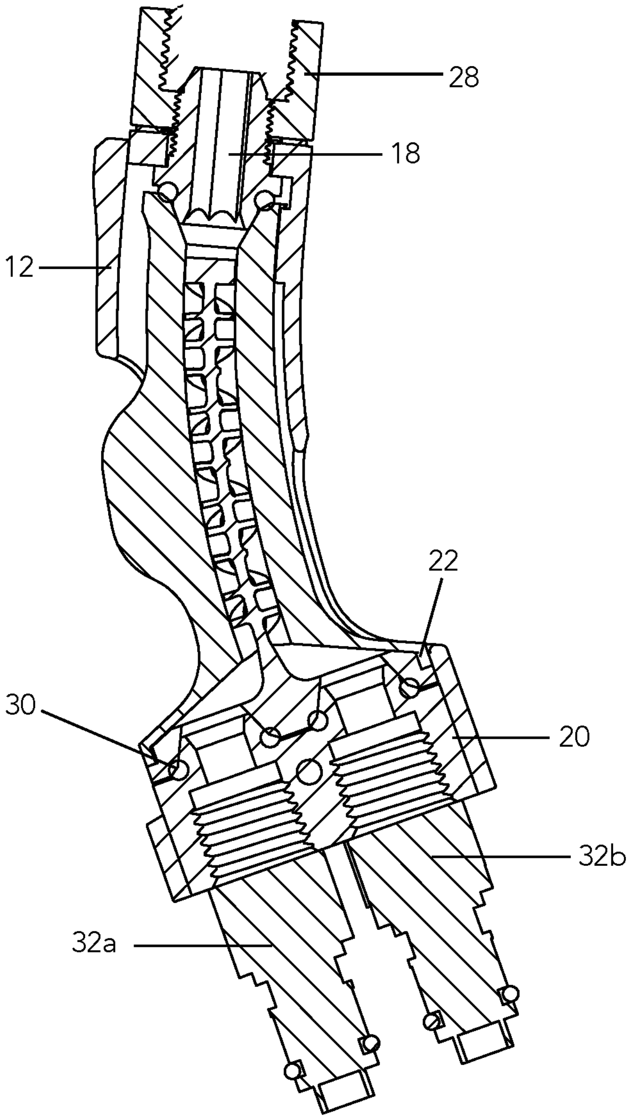
FIG. 5B is a side cross-sectional side view of a multi-component mixing device with the lever arm in a closed position and an engaged mixing cartridge.

FIG. 5B is a cross-sectional view of the mixing device through plane A-A' in FIG. 5A. Lever arm 12 is in a closed position and movable engagement base 20 on the mixing device is in a raised position and engaged with cartridge input end 22 to form a fluidic seal at both the cartridge input and output ends. Secure engagement of the mixing device to the cartridge can be further mediated by sealing rings 30 on the mixing device that mate with compatible features on the removable cartridge. Applicator adapter 28 is shown with a smaller diameter set of threads to engage with the mixing device and a larger set of threads to engage with an applicator receiving mixed fluid from the mixing cartridge through mixed fluid conduit 18. Fluid supply adapter 32*a*, 32*b* connect the fluids to the mixing device and can be attached and removed from the mixing device, shown here via threaded engagement.

Figure 6A:
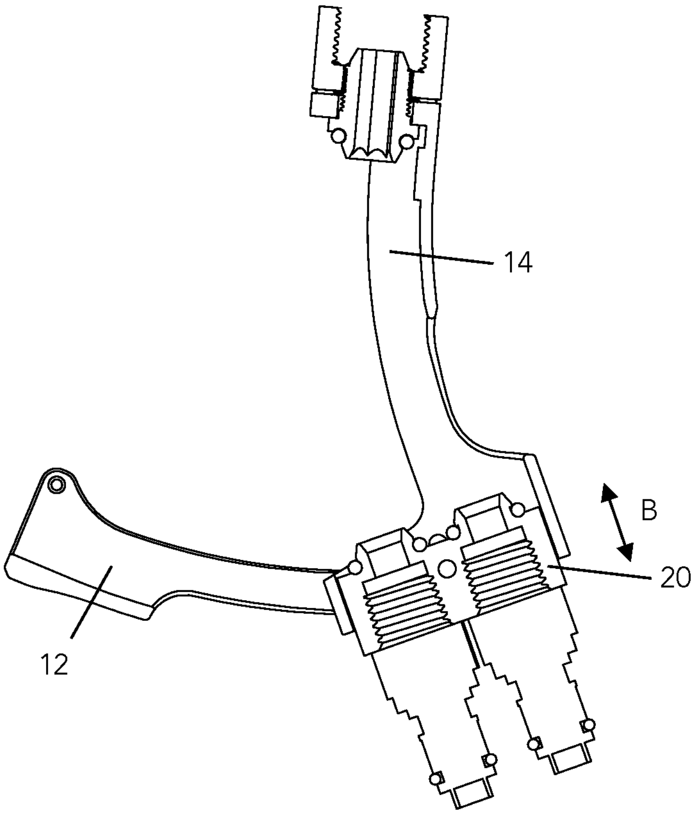
FIG. 6A is a side view of a multi-component mixing device with the lever arm in an open position.

FIG. 6A is a side view of the mixing device with the lever arm 12 in an open position with cartridge engagement base 20 in a lowered position relative to the device body 14 to allow insertion or removal of a removable mixing cartridge. In this configuration, cartridge engagement base 20 is moved downward along axis B, and the mixing device is open to allow mixing cartridge placement or removal.

Figure 6B:
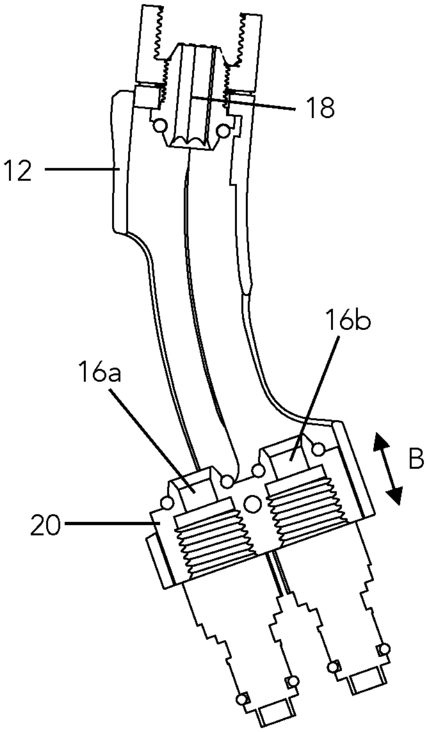
FIG. 6B is a side view of a mixing device with the lever arm in a closed position.

FIG. 6B is a side view of the mixing device with the lever arm 12 in a closed position to highlight an elevated conformation of the cartridge engagement base 20. In this operating state position the engagement base 20 is in a raised position relative to the mixed fluid conduit 18 of the mixing device to fluidly connect with and retain a mixing cartridge. In this conformation, the fluid input conduits 16*a*, 16*b* and mixed fluid conduit 18 are closest together, and designed and sized to accommodate a custom mixing cartridge therebetween. Preferably, pressure-sealing o-rings are places adjacent the fluid input conduits 16*a*, 16*b* and mixed fluid conduit 18 to provide additional sealing of the mixing device to the removable cartridge. Polygonal, angled or beveled matching engagement features on the cartridge mixing chamber input and output ends with the fluid input conduits and mixed fluid conduit of the mixing device can assist with the pressure fit of the device fluid conduits and fluid ports in the mixing cartridge to create fluid-tight seals. Pressure-sealing rings at fluid conduit junctions can also assist in establishing and maintaining a fluid-tight sealing connection. As shown, closure of the lever arm 12 gives rise to a elevation of the cartridge engagement base 20 upward along axis B to fluidically seal a mixing cartridge when positioned inside the mixing device body 14.

Figure 7A:
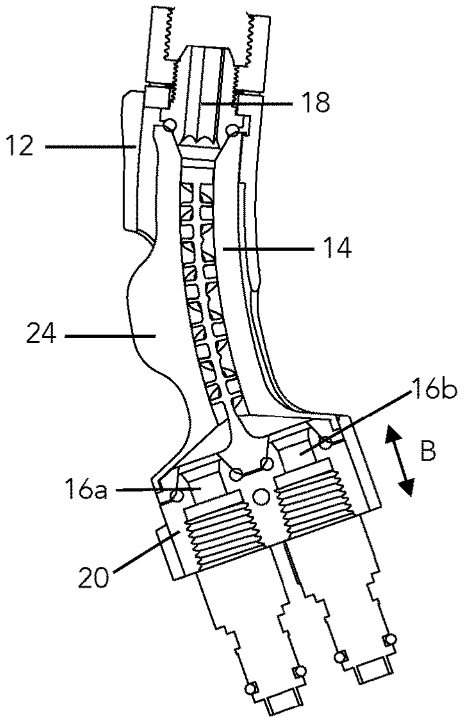
FIG. 7A is a side cross-sectional side view of a multi-component mixing device with engaged mixing cartridge and lever arm in a closed position.
Figure 7B:
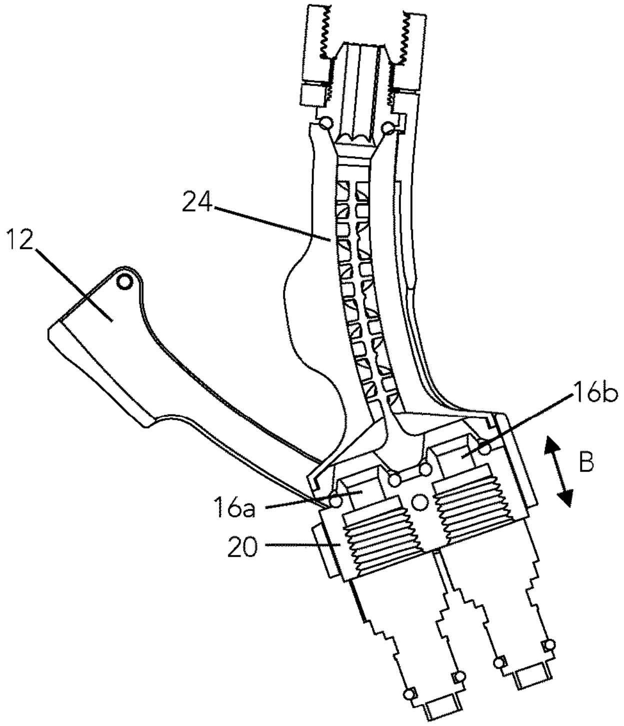
FIG. 7B is a side cross-sectional view of a multi-component mixing device with engaged mixing cartridge with the lever arm in a partially open position.
Figure 7C:
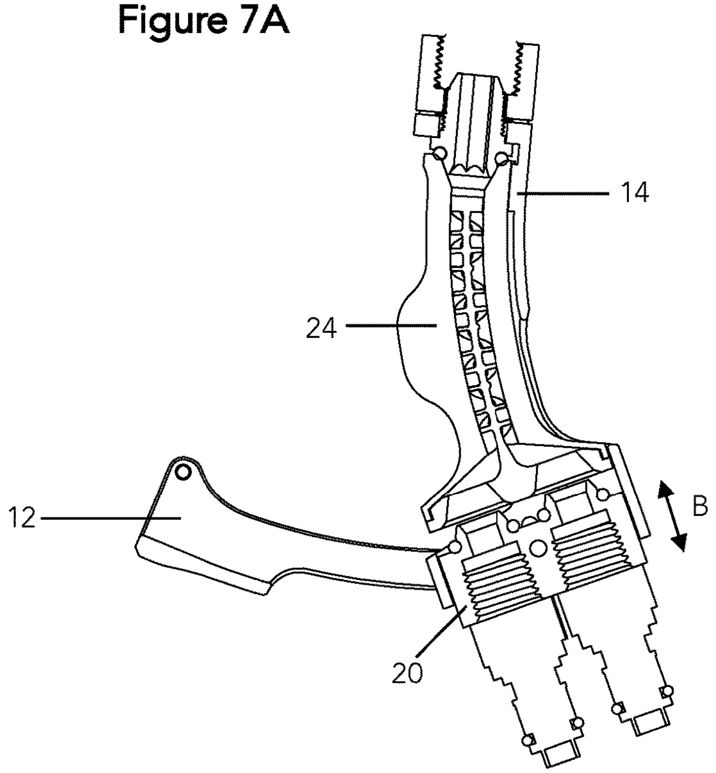
FIG. 7C is a side cross-sectional view of a multi-component mixing device with engaged mixing cartridge with the lever arm in a fully open position.

FIGS. 7A-7C show the motion of the mixing device and cartridge from a fully engaged position where the mixing cartridge is pressure fitted and sealed with the fluid conduits in the mixing device to a fully disengaged position where the mixing chamber in the mixing cartridge is fluidically disengaged from the mixing device fluid conduits. FIG. 7A is a side cross-sectional view of a mixing device with the lever arm 12 in a closed position and a mixing cartridge 24 secured to the device body 14 by engagement of the mixing cartridge 24 with the engagement base 20 of the mixing device. The cartridge base comprises fluid input conduits which are attached to fluid supply adapters that direct fluid entering the mixing device to fluid input conduits 16*a*, 16*b*. With the lever arm 12 closed, the engagement base 20 is elevated along axis B to guarantee a pressure-fit of the mixing cartridge 24 to fluid input conduits 16*a*, 16*b* and mixed fluid conduit 18 on the mixing device.

FIG. 7B is a cross-sectional side view of the mixing device with the lever arm 12 in a partially open position and engagement base 20 of the mixing device separated by a small distance from the mixing cartridge 24 along axis B. In this partially open position, the fluid input conduits 16*a*, 16*b* and mixed fluid conduit 18 of the mixing device are disengaged with the mixing chamber of the mixing cartridge 24, however the mixing cartridge is not yet removable from the mixing device.

FIG. 7C is a side cross-sectional view of the mixing device with the lever arm 12 in a fully open position with the engagement base 20 fully depressed and lowered along axis B. Mixing cartridge 24 can be freely removed from the device body 14.

Figure 8A:
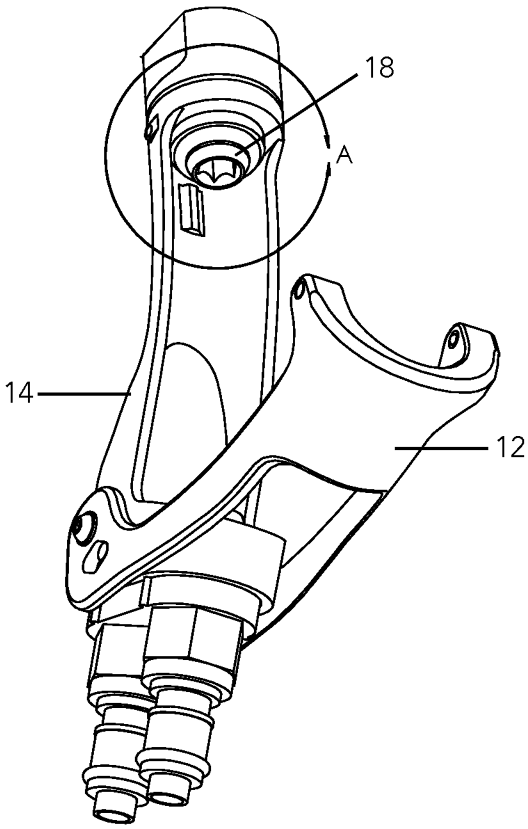
FIG. 8A is a bottom isometric view of a multi-component mixing device with the lever arm in an open position showing the mixed fluid conduit.

FIG. 8A is a bottom isometric view of the mixing device with the lever arm 12 in an open position and the cartridge omitted to expose the fluid receiving end and mixed fluid conduit 18 of the device body 14.

Figure 8B:
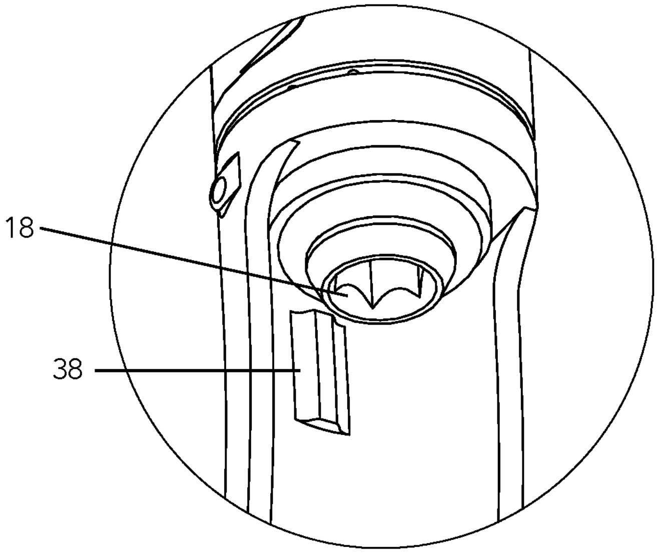
FIG. 8B is an enlarged view of the mixed fluid conduit of a multi-component mixing device and an alignment feature for alignment with a mixing cartridge.

FIG. 8B is an enlarged view of the mixed fluid conduit 18 and cartridge alignment feature 38 for alignment of the mixing device with a mixing cartridge. The cartridge alignment feature 38 shown is a protrusion and can be used with a matching alignment channel in a custom mixing cartridge. Mating of a cartridge alignment feature on the mixing device with a matching alignment feature on the cartridge ensures proper alignment of the fluid conduits and proper orientation of the cartridge in the mixing device.

Figure 9A:
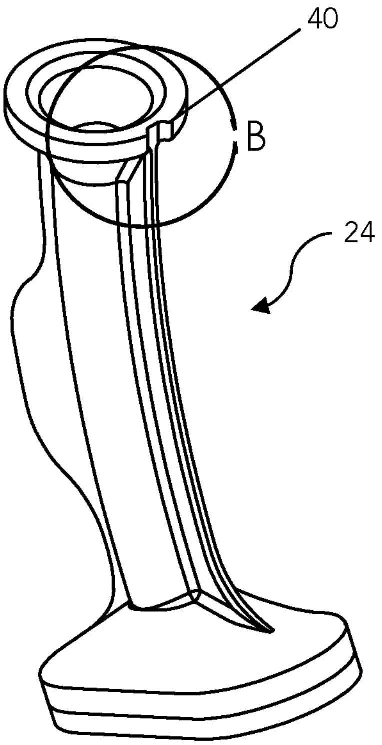
FIG. 9A is an isometric view of a mixing cartridge showing an alignment feature for alignment with a multi-component mixing device.

FIG. 9A is an isometric view of a mixing cartridge 24 with an alignment channel 40 to accommodate and match with an alignment feature on the inside device body. The mixing chamber 26 of mixing cartridge 24 is shown without a baffle or baffle mixing structure.

Figure 9B:
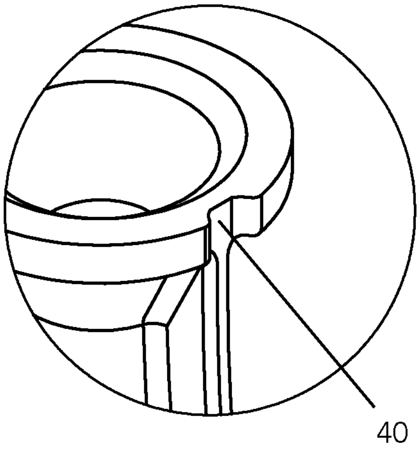
FIG. 9B is an enlarged view of an alignment feature of a mixing cartridge for alignment with a multi-component mixing device.

FIG. 9B is an enlarged view of an alignment feature for alignment with a spray mixing device. In this case, alignment channel 40 along an upper region of a cartridge mixer can engage with and slide relative to an alignment protrusion on the device body as the cartridge is aligned with and secured to a mixing device.

Figure 10A:
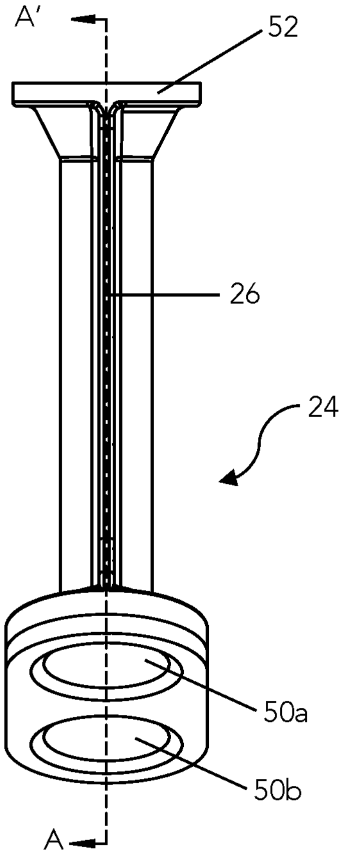
FIG. 10A is a bottom isometric view of a mixing cartridge and mixing cartridge fluid conduits including fluid input ports and mixed fluid output port.

FIG. 10A is a bottom isometric view of a removable mixing cartridge and cartridge fluid conduit. Mixing cartridge 24 is shown with two fluid input ports 50*a*, 50*b* and out a single mixed fluid output port 52 with a mixing chamber 26 therebetween.

Figure 10B:
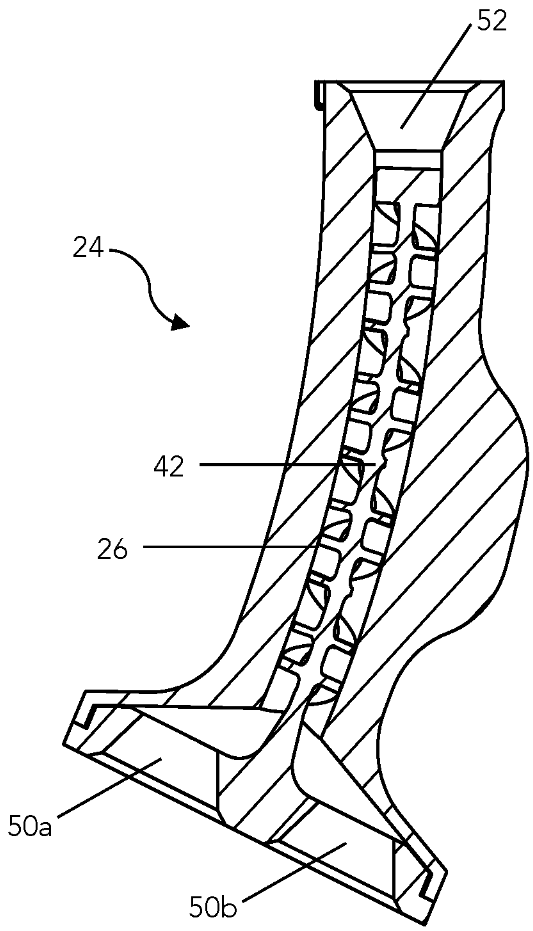
FIG. 10B is a side cross-sectional view of a mixing cartridge with a baffle mixer inside the cartridge mixing chamber.

FIG. 10B is a side cross-sectional view of a cartridge along axis A-A' in FIG. 10A with a baffle mixer 42 inside the cartridge mixing chamber 26. Mixing cartridge 24 is shown with two fluid input ports 50*a*, 50*b* and out a single mixed fluid output port 52 with a mixing chamber 26 therebetween housing a baffle mixer 42. Fluids moving through the cartridge 24 and along the baffle insert 42 experience repeated recombination events that encourage rapid mixing of fluids entering the system while ensuring that all fluids exiting it are mixed to the same extent. By ensuring effective mixing in a fluid-tight mixing device overmixing can be prevented and minimal waste results, including waste of overmixed fluid, unused fluid, and the mixing cartridge. In one preferable embodiment the mixing chamber is disposable. The mixing device can also be used with a specialized cleaning cartridge which can be placed between the fluid inlets and outlets, and cleaning fluids can be used to ensure that the mixing device is kept clean and free of contamination between uses.

The mixing cartridge 24 is of similar and matching shape to the device body such that the mixing chamber mates with the device body. The size of the mixing chamber is sized to allow the inlet and outlet port(s) to seal with the device body at the inlet ends and outlet end such that the mixing chamber is prevented from leaking fluid when fully engaged with the mixing device. Various fluid combinations of the mixing device and matching mixing chamber may be used including 2:1, 3:1 and 4:1 mixing ratios. In this way the number of inlet ports of the mixing chamber can coincide with the ratio or fluid needed for particular applications. For example, a 2:1 ratio mixing material would include two inlet ports and one outlet port. This is the same for a 3:1 ratio material which would use three inlet ports and 1 outlet port, with the fluid mixing device having three fluid supply adaptors sized to mate with three inlet ports on the removable mixing chamber. These ports will be reflective to the number of ports at the inlet and outlet stage of the device body. In one preferable embodiment the mixing device outlet port and/or mixed fluid output conduit will have a notched shape that coincides with an exact opposing shape on the device body. The notched shape is used to align the mixing canister to the device body. In another alternative, the sealing circumference of the fluid supply adapters on the mixing device or mixed fluid output conduit can have a matching circumferential shape to the fluid inlet port and fluid output port on the mixing chamber, respectively. This matching ports on the mixing device and inlet and outlets on the mixing chamber also ensure good sealing and prevent leakage during high pressure use. The inlet and outlet port of the mixing device can be of any shape but must be of a shape that allows the mixing chamber to seal to the device body.

Figure 11:
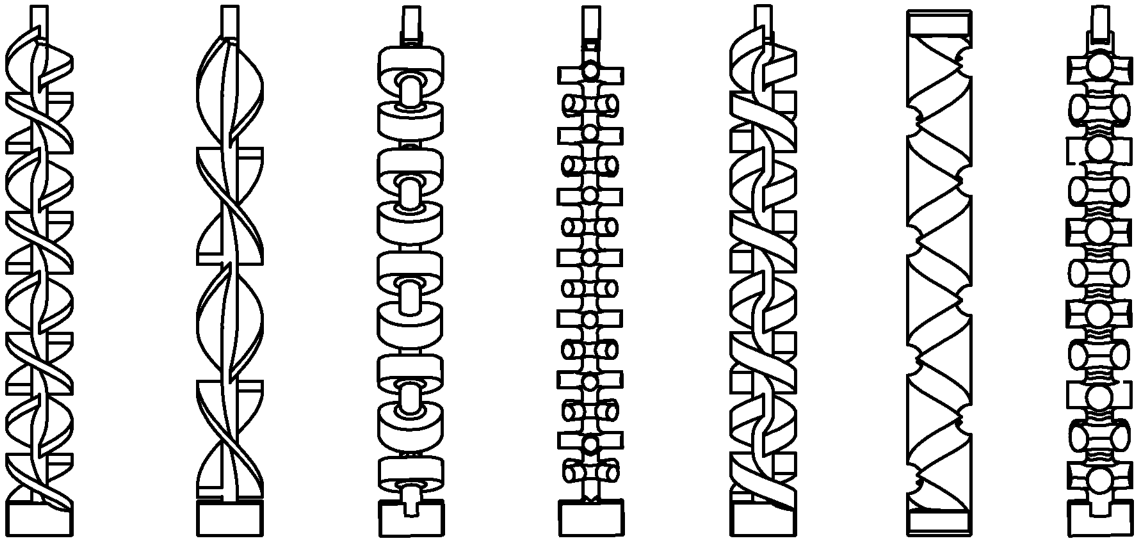
FIG. 11 is an illustration of a variety of different types of baffle mixer inserts suitable for fitting inside the mixing chamber of a mixing cartridge.

FIG. 11 is an illustration of a variety of different types of baffle mixers suitable for fitting inside the mixing chamber of a mixing cartridge. The baffle inserts shown have various designs of baffles to assist in directing and mixing the two fluids entering the mixing cartridge. Baffle inserts may take on different forms to accommodate liquids of different viscosities or to alter the frequency of recombination events as needed for a particular application and may be removable from the mixing canister or an integral part of the mixing canister. The user may have a variety of baffle inserts to choose from and can select the appropriate baffle insert for a particular set of materials to be mixed. By regulating the frequency of fluid recombination events using a baffle mixer the internal channel networks within the mixing chamber can increase mixing such that introduced fluids are exposed to recombination events with similarly unmixed substances at early stages of the mixing process.

In use, the present mixing device and matching mixing cartridge offers an opportunity to reduce overmixing by metering out the desired amount of fluids to be mixed at the desired ratio and under the desired pressure. This fluid metering also provides an opportunity for suppliers to accurately measure exactly how much expendable products are being used and to charge clients and customers accordingly.

The present mixing device is also especially useful for mixing fluid substances that react and harden, such as those that polymerize or cure when combined, as these materials often need to be rapidly combined and applied within a specific period of time. By controlling the fluid pressure and cartridge design the present mixing device can be used to mix and apply these sensitive mixed products to achieve optimal results and prevent clogging and wastage. For these curing mixtures, a removable and disposable mixing chamber allows for the exchange of cartridges in the event of such clogging. Moreover, the pressure-fitting fluid-tight fitted design of the cartridge to the device body makes cartridge removal and exchange simple while reducing the possibility that escaped fluid will adhere the mixing cartridge to the mixing device.

The mixing device can be connected to a computer system which suggests how much of each of the fluid components is required to mix based on the number of parts being sprayed, and in what ratio. Such recipes are often provided by the manufacture of the fluid components or known in the art and are specific to the product being prepared. The delivery of the fluids can also be metered at specific ratios that are set out by the manufacturer for proper curing. Integrated pumps can also send the fluids at pressure to the single component mixing chamber that will effectively mix the two liquids together at the optimal pressure and for the optimal time to initiate the chemical curing process.

When incorporated into a fluid application system, the presently described mixing device can control the fluid pressure and air pressure, two aspects to surface finishing that greatly affect the transfer efficiency of the paint to the panel. Fluid pressure and air pressure can also be controlled by attachment of the mixing device to one or more pumps or compressors. In a multi-component mixing system the ratio and applied pressure is particularly important where an improper ratio might lead to unreacted fluid components or inadequate mixing. In painting, better transfer efficiency means less paint needed per job and more paint lands on the surface being painted rather than as "overspray" that is sucked into the paint booth filters. The present mixing device can assist with optimizing the transfer efficiency of any paint based on the viscosity of the paint by controlling air pressure and fluid pressure, which can be controlled via software function on the pump system connected to the mixing device. With a computer-controlled mixing system transfer efficiency can be optimized by ensuring that the suggested settings set out by the applicator and fluid manufacturer are used for fluid application. The system will also mitigate the over mixing of fluids by only mixing what is needed for spraying as the user needs it.

In automotive applications, the software of the system can allow the user to input the year/make/model of a particular vehicle being coated, the panels being sprayed, or part thereof. This will allow for data tracking of specific vehicles and their panel surface area and calculate how much of any component is needed at optimal spraying conditions. The software can also job cost any job being sprayed for internal use or optimization of gross profitability on shop materials. Additionally, the software can control the function of the pumps to apply the desires application conditions to the mixing device and attached applicator.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

I claim:

1. A multi-component fluid mixing device comprising:
- a device body comprising at least two fluid supply adapters for receiving fluid input and a mixed fluid output conduit;
- an engagement base comprising at least two fluid input conduits fluidly connected to the fluid supply adapters;
- an actuator connected to the engagement base, wherein actuation of the engagement base by the actuator moves the fluid input conduits on the engagement base toward the mixed fluid output conduit;
- an adapter adjacent the mixed fluid output conduit to attach the mixing device with an application device; and
- a mixing cartridge comprising a mixing chamber fluidly connecting the at least two fluid supply adapters and the mixed fluid output conduit.

2. The device of claim 1, wherein the actuator is a lever arm connected to the device body by a hinge.

3. The device of claim 1, wherein the actuator is lockable in an operating state when the engagement base is fully raised relative to the mixed fluid output conduit.

4. The device of claim 1, wherein the mixing cartridge is removably from the device body.

5. The device of claim 1, wherein the device body comprises an alignment feature to align the mixing cartridge in the device body.

6. The device of claim 1, wherein the at least two fluid supply adapters comprise a valve for controlling fluid flow.

7. The device of claim 6 wherein the valve is a check valve.

8. The device of claim 1, further comprising an engagement feature for matching engagement with a mixing cartridge.

9. The device of claim 1 comprising more than two fluid input conduits.

10. A multi-component fluid mixing system comprising:
- a mixing device comprising:
  - a device body comprising at least two fluid supply adapters for receiving fluid input and a mixed fluid output conduit;
  - an engagement base comprising at least two fluid input conduits fluidly connected to the fluid supply adapters;
  - an actuator connected to the engagement base, wherein actuation of the engagement base by the actuator moves the fluid input conduits on the engagement base toward the mixed fluid output conduit; and
  - an adapter adjacent the mixed fluid output conduit to attach the mixing device with an application device; and
- a mixing cartridge comprising a mixing chamber, the mixing chamber having an input end with at least two fluid input ports for fluid engagement with the at least two fluid supply conduits of the device body and an output end having one mixed fluid output port for fluid engagement with the mixed fluid output conduit of the device body.

11. The mixing system of claim 10, wherein the mixing cartridge comprises a baffle insert inside the mixing chamber positioned between the at least two fluid input ports and the fluid output port.

12. The mixing system of claim 11, wherein the baffle insert is removable.

13. The mixing system of claim 10, wherein the mixing cartridge and mixing device further comprise complementary engagement features for matching engagement of the mixing device to the mixing cartridge.

14. The mixing system of claim 10, wherein the device body comprises two fluid supply adapters and the mixing cartridge comprises two fluid input ports.

15. The mixing system of claim 10, wherein the actuator is a lever arm connected to the device body by a hinge.

16. The mixing system of claim 10, wherein the actuator is lockable in an operating state when the engagement base is raised relative to the mixed fluid output conduit.

17. The mixing system of claim 10, wherein the at least two fluid supply adapters comprise a valve for controlling fluid flow.

18. The mixing system of claim 10, wherein the mixing cartridge is fluidically sealed to the mixing device when the engagement base is fully raised relative to the mixed fluid output conduit.

19. A multi-component fluid mixing system comprising:

a mixing cartridge comprising a cartridge base comprising at least two fluid inputs, a mixed fluid output connected to a mixed fluid output conduit, and a mixing chamber therebetween fluidly connecting the at least two fluid inputs and the mixed fluid output conduit;

a device body comprising a fluid input end comprising an engagement base for engagement with the cartridge base and a mixed fluid output end;

an actuator connected to the engagement base, wherein actuation of the actuator moves the engagement base of the device body toward the mixed fluid output end of the device body to create a pressure-fit sealing connection between the fluid input end of the device body and the cartridge base and between the mixed fluid output end of the device body and the mixed fluid output of the mixing cartridge.

20. The mixing system of claim 19, wherein the mixing cartridge comprises a baffle insert inside the mixing chamber positioned between the at least two fluid input ports and the fluid output port.

* * * * *